United States Patent
Deniau et al.

(10) Patent No.: US 9,517,665 B2
(45) Date of Patent: Dec. 13, 2016

(54) APPARATUS AND METHOD FOR COMPENSATING FOR ATMOSPHERIC PRESSURE IN A TPMS SYSTEM

(71) Applicant: Continental Automotive Systems, Inc., Auburn Hills, MI (US)

(72) Inventors: Jean-Christophe Deniau, Fenton, MI (US); Alexander Fink, Oakland Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 18 days.

(21) Appl. No.: 14/576,894

(22) Filed: Dec. 19, 2014

(65) Prior Publication Data

US 2016/0176246 A1   Jun. 23, 2016

(51) Int. Cl.
*B60Q 1/40* (2006.01)
*B60C 23/04* (2006.01)

(52) U.S. Cl.
CPC ....... *B60C 23/0433* (2013.01); *B60C 23/0408* (2013.01); *B60C 23/0476* (2013.01)

(58) Field of Classification Search
CPC .. F02D 41/021; B60C 23/009; B60C 23/0408; B60C 23/005; B60C 23/0433; B60C 23/0476; B60C 23/0486; B60C 23/20
USPC ...... 701/103, 33.7, 38; 73/40; 340/447, 445, 340/438, 441, 442
See application file for complete search history.

(56) References Cited

U.S. PATENT DOCUMENTS

| | | | | |
|---|---|---|---|---|
| 5,825,286 A | * | 10/1998 | Coulthard | B60C 23/009 340/442 |
| 5,963,128 A | * | 10/1999 | McClelland | B60C 23/0433 340/440 |
| 7,643,912 B2 | * | 1/2010 | Heffington | G07C 5/085 340/425.5 |
| 2002/0121132 A1 | | 9/2002 | Breed et al. | |
| 2002/0130771 A1 | * | 9/2002 | Osborne | B60C 23/005 340/438 |
| 2002/0158805 A1 | | 10/2002 | Turnbull et al. | |

(Continued)

FOREIGN PATENT DOCUMENTS

| | | |
|---|---|---|
| GB | 2405931 A | 3/2005 |
| WO | 98/06078 A1 | 2/1998 |
| WO | 2009/036547 A1 | 3/2009 |

OTHER PUBLICATIONS

International Search Report and Written Opinion dated Mar. 17, 2016 from corresponding International Patent Application No. PCT/US2015/066183.

(Continued)

*Primary Examiner* — Hoi Lau

(57) ABSTRACT

An altitude of the vehicle from an external electronic source and an external temperature is received from a temperature sensor are received. An external relative humidity is determined. Based upon the altitude, the temperature, and the external relative humidity, an estimated barometric pressure is determined. An air pressure of a tire is received. An adjustment is made to the received pressure to obtain a corrected pressure. The amount of adjustment is based upon the estimated barometric pressure and the adjustment is applied to the air pressure to obtain a corrected tire pressure. An evaluation is made of the corrected tire pressure to determine when an alert should be presented to a user. When the alert is determined, the alert to the user is presented to the user.

18 Claims, 4 Drawing Sheets

(56) References Cited

U.S. PATENT DOCUMENTS

| | | | |
|---|---|---|---|
| 2006/0139158 A1* | 6/2006 | Miller | B60C 23/0408 340/445 |
| 2007/0040660 A1* | 2/2007 | Miller | B60C 23/0408 340/442 |
| 2007/0090935 A1* | 4/2007 | Miller | B60C 23/0408 340/445 |
| 2007/0120659 A1* | 5/2007 | Pearce | B60C 23/0408 340/447 |
| 2008/0061625 A1* | 3/2008 | Schmitt | B60C 23/0408 303/146 |
| 2008/0243335 A1* | 10/2008 | Rao | B60C 23/0408 701/38 |
| 2010/0013618 A1* | 1/2010 | Patel | B60C 23/0408 340/447 |
| 2015/0032357 A1* | 1/2015 | Dudar | F02D 41/021 701/103 |
| 2015/0134197 A1* | 5/2015 | Cahill | B60C 23/0476 701/33.7 |
| 2016/0176246 A1* | 6/2016 | Deniau | B60C 23/0408 340/447 |

OTHER PUBLICATIONS

Search Report dated Jan. 26, 2016, from corresponding GB Patent Application No. GB1511236.0.

* cited by examiner

APPARATUS AND METHOD FOR COMPENSATING FOR ATMOSPHERIC PRESSURE IN A TPMS SYSTEM

TECHNICAL FIELD

This application relates to tire pressure monitoring system (TPMS) systems and compensating for atmospheric pressure in these systems.

BACKGROUND

Tire pressure monitoring sensors obtain the pressure of the tire. Such sensors might also obtain other information such as the temperature of the air in the tire. Once these devices obtain this information, the information may be sent to a receiver (e.g., at an electronic control unit) in the vehicle of the vehicle. The receiver may analyze the tire pressure information and if the pressure is too low, may issue a warning to the driver of the vehicle. The instrument panel of the vehicle is coupled to the receiver so that the pressure information may be displayed or otherwise presented to occupants of the vehicle.

Direct TPM sensors measure the air pressure inside the tire in which they are disposed with respect to a stable, common reference vacuum. Before being transmitted to the receiver, a first compensation is typically made to offset the vacuum. The reported tire pressure on the instrument panel of some vehicles also takes into consideration the measured atmospheric pressure available at the vehicle via dedicated atmospheric pressure sensors at the vehicle. Thus, before being presented on the instrument panel a second compensation is made to take into consideration the atmospheric pressure where the vehicle is located.

Some vehicles such as electric vehicles do not have sensors that measure atmospheric pressure. Consequently, the pressure of the tire cannot be adequately or correctly compensated before it is presented to a user. As a result, improper readings are sometimes presented to users and this has resulted in user dissatisfaction with previous approaches.

BRIEF DESCRIPTION OF THE DRAWINGS

For a more complete understanding of the disclosure, reference should be made to the following detailed description and accompanying drawings wherein.

Figure 1:
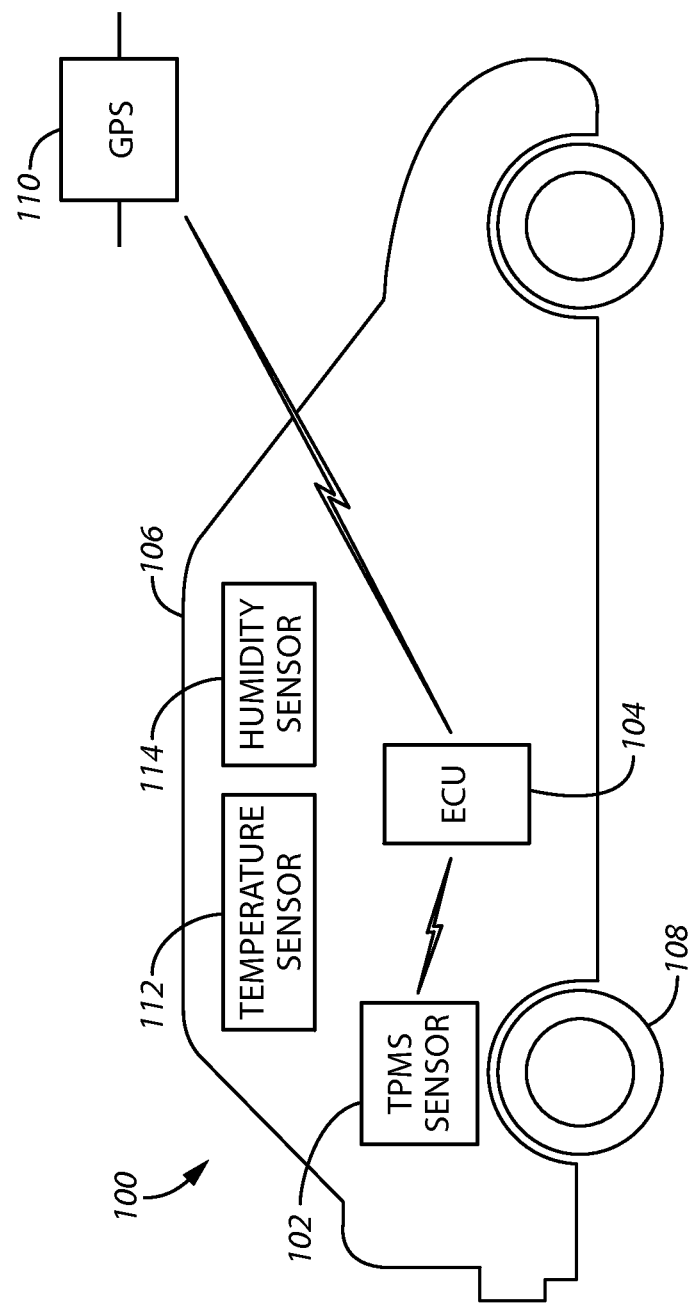
FIG. 1 comprises a block diagram of a TPMS system according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

In the present approaches, a determination of the atmospheric pressure is made based on the ambient temperature, the vehicle elevation (via GPS or altitude indication via web sites as Google Earth) and, if available and in some aspects, a relative humidity indication. Advantageously, the present approaches can eliminate the Manifold Absolute Pressure or the barometric pressure sensor required by the engine controller of an internal combustion engine.

In some aspects, if the relative humidity information is not available as an input, a default value could be used. This default value is determined in order to have the smallest possible impact on the determination of the barometric pressure.

In some of these embodiments, an altitude of the vehicle from an external electronic source and an external temperature is received from a temperature sensor are received. An external relative humidity is determined. Based upon the altitude, the temperature, and the external relative humidity, an estimated barometric pressure is determined. An air pressure of a tire is also received. An adjustment is made to the received pressure to obtain a corrected pressure. The amount of adjustment is based upon the estimated barometric pressure and the adjustment is applied to the air pressure to obtain a corrected tire pressure. An evaluation is made of the corrected tire pressure to determine when an alert should be presented to a user. When the alert is determined, the alert to the user is presented to the user.

In some aspects, the corrected tire pressure is determined according to the equation $$P_0 e^{-\frac{mgh}{kT}},$$

where $P_0$ is the barometric pressure at sea level; m is the molecular mass of air; g is the gravitational acceleration near Earth's surface, h is the altitude; k is the Boltzmann's constant; and T is the temperature. In other aspects, the pressures may be determined according to a an equivalent equation or a different gas pressure or atmospheric model, for example an equation using the molar mass of gas, the universal gas constant, partial gas pressures, a perfect gas model, a calorically perfect gas model, a thermally perfect gas model, a semi-perfect gas model, an ideal gas model, an imperfect gas model, or otherwise. In other aspects, the tire pressure is received from a message from the TPMS sensor. In still other examples, the altitude is received from a global positioning satellite (GPS) system. In other aspects, the external relative humidity is determined by receiving the external relative humidity from an external relative humidity sensor.

In others of these embodiments, an electronic control unit (ECU) includes an electronic interface and a controller. The electronic interface has an input and output. The input is configured to receive an altitude of the vehicle from an external electronic source and an external temperature is received from a temperature sensor.

The controller is coupled to the electronic interface and is configured to determine an external relative humidity. The controller is configured based upon the altitude, the temperature, and the external relative humidity to determine the estimated barometric pressure. The controller is configured to receive an air pressure of a tire at the input of the electronic interface and obtain a corrected pressure. An adjustment is made to the measured pressure to obtain the corrected pressure. The amount of adjustment is based upon the estimated barometric pressure. The adjustment is applied to the air pressure to obtain a corrected tire pressure. The controller is configured to evaluate the corrected tire pressure to determine when an alert should be presented to a user, and when the alert is determined, the alert is presented to the user via the output of the electronic interface.

Referring now to FIG. 1, one example of a system 100 that calculates barometric pressure for adjustments to measured TPMS pressure is described. The system 100 includes a TPMS sensor 102, an electronic control unit (ECU) (receiver) 104, and all of these elements are disposed at a vehicle 106 that has tires 108.

The TPMS sensor 102 senses pressure and/or other information (e.g., temperature) from the tire 108. The ECU 104 receives messages from the TPMS sensor 102 and processes these messages. For example, when data from the TPMS sensor 102 indicates the air pressure in the tire 108 has reached too low of a level, a warning may be issued to the occupant (e.g., driver) of the vehicle 106. In these regards, the ECU 104 may be coupled to a graphical user interface (GUI) such as a display screen where this information can be presented to the occupant or user of the vehicle 106. The ECU 104 may be coupled to other devices within the vehicle (e.g., the engine system, the braking system, the lighting system to mention a couple of examples) and perform various types of functions (e.g., processing functions, control functions, monitoring functions to mention a few examples) with respect to these other devices. In addition, the ECU 104 may be communicatively coupled (e.g., wired or wirelessly) to other networks external to the vehicle 106 (e.g., cellular communication networks, the internet, wide area networks, to mention a few examples).

The ECU 104 also determines the atmospheric pressure is made based on the ambient temperature, the vehicle elevation (via GPS or altitude indication via web sites as Google Earth) and if available a relative humidity indication. In these regards, the ECU 104 receives information from a GPS system 110, a temperature sensor 112, and a relative humidity sensor 114.

The change in pressure associated with a small change in altitude can be found in terms of weight of air. For a volume (A·Δh), where A is a nominal surface and Δh is a change (delta) in elevation, the difference in pressure ΔP can be expressed as:

$$\Delta P = \frac{-\rho g A \Delta h}{A} = -\rho g \Delta h;$$

where ρ is the mass density of air.

Therefore, the change in pressure depends on the air density. However, the density of air also depends on the pressure as $$\rho = \frac{mP}{kT},$$

which leads to:

$$\frac{\Delta P}{\Delta h} = -\frac{mgP}{kT}$$

The solution for such an equation is:

$$P_h = P_0 e^{-\frac{mgh}{kT}}$$

where:
  $P_0$ is the barometric pressure at sea level;
  m is the molecular mass of air;
  g is the gravitational acceleration near Earth's surface;
  h is the height above sea level (altitude) in meters;
  k is the Boltzmann's constant; and
  T is the temperature in Kelvins.

It will be appreciated that the molar weight of air can vary between dry air (0.0289644 kg/mol) to 100% water vapor saturated air (around 0.0180153 kg/mol).

The molar weight of the air can be taken into consideration if the vehicle is equipped with a relative humidity sensor. In other words, the measured humidity can be used to find a molar weight of the air and this weight utilized in the above-mentioned equation.

As stated previously, for TPMS applications, the displayed pressure to the driver and the pressure values used in the warning algorithm are more accurate if the atmospheric pressure is taken into consideration.

Figure 2:
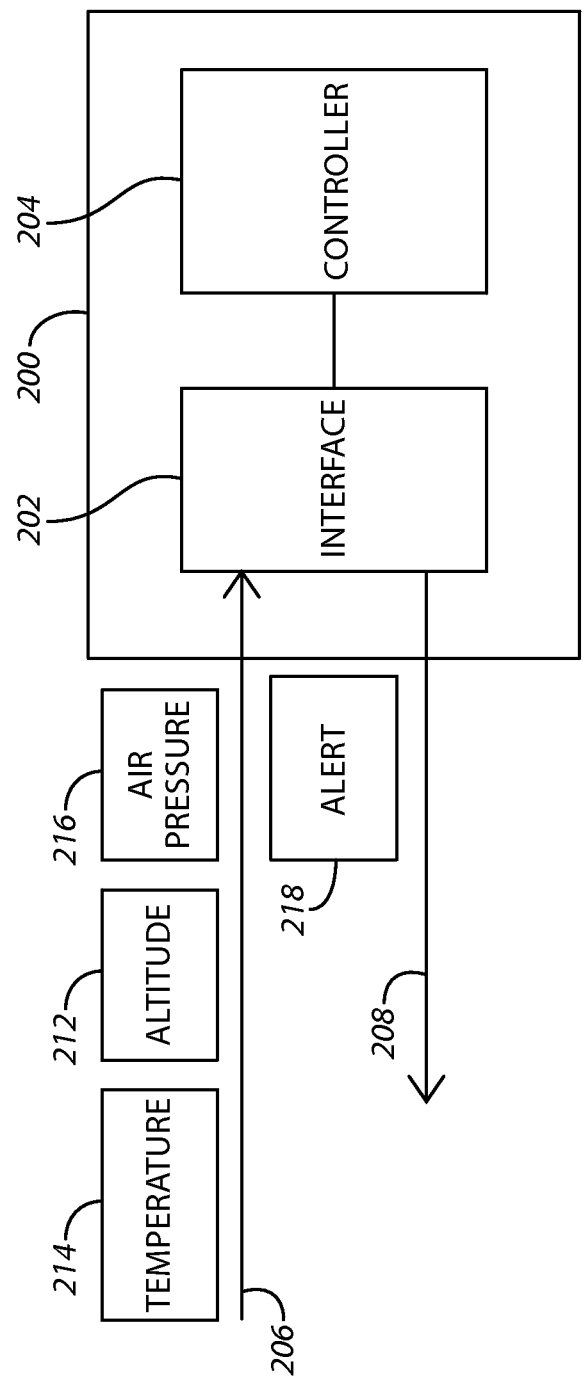
FIG. 2 comprises a block diagram of an electronic control unit (or receiver) according to various embodiments of the present invention.

Referring now to FIG. 2, one example of an electronic control unit (receiver) 200 is described. The ECU 200 includes an electronic interface 202 and a controller 204. The electronic interface 202 has an input 206 and output 208. The input 206 is configured to receive an altitude 212 of the vehicle from an external electronic source and an external temperature 214 is received from a temperature sensor.

The controller 204 is coupled to the electronic interface 202 and is configured to determine an external relative humidity. The controller 204 is configured based upon the altitude, the temperature, and the external relative humidity to determine the estimated barometric pressure. The controller 204 is configured to receive an air pressure 216 of a tire at the input of the electronic interface and obtain a corrected pressure. An adjustment is made to the measured pressure to obtain the corrected pressure. The amount of adjustment is based upon the estimated barometric pressure. The adjustment is applied to the air pressure to obtain a corrected tire pressure. The controller 204 configured to evaluate the corrected tire pressure to determine when an alert 218 should be presented to a user, and when the alert is determined, the alert is presented to the user via the output of the electronic interface 202.

In some aspects, the corrected tire pressure is determined according to the equation $$P_0 e^{-\frac{mgh}{kT}},$$

where $P_0$ is the barometric pressure at sea level; m is the molecular mass of air; g is the gravitational acceleration near Earth's surface, h is the altitude; k is the Boltzmann's constant; and T is the temperature. In other aspects, the tire pressure is received from a message from the TPMS sensor. In other examples, the altitude is received from a global positioning satellite (GPS) system. In yet other aspects, the external relative humidity is determined by receiving the external relative humidity from an external relative humidity sensor.

Figure 3:
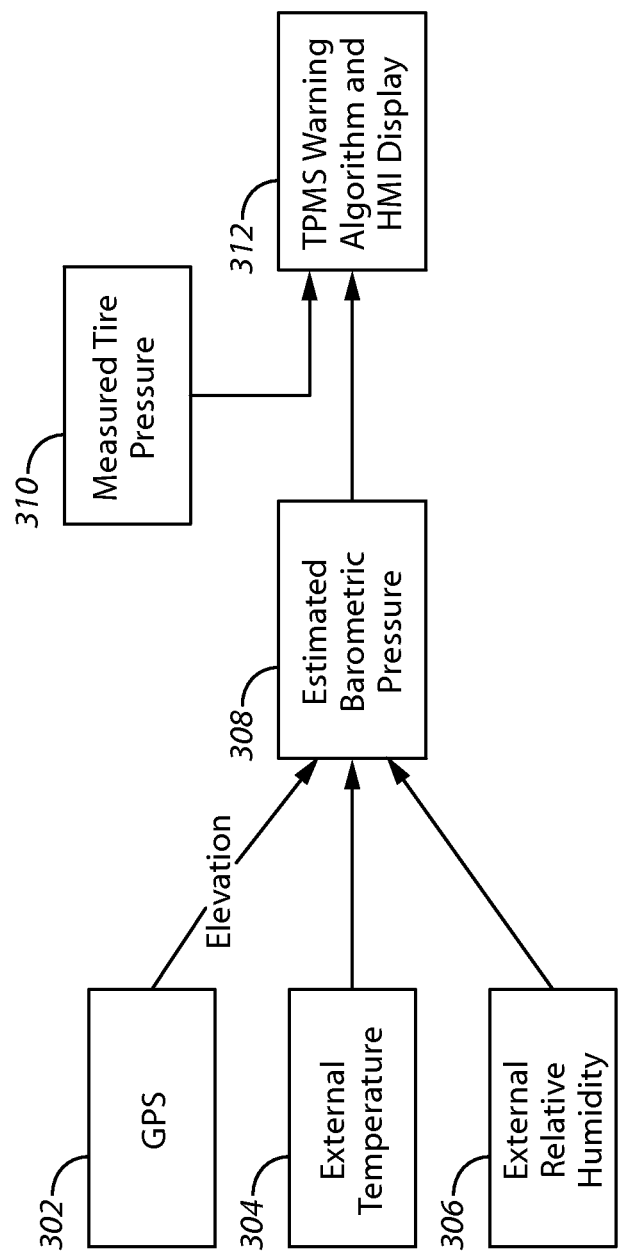
FIG. 3 comprises a flow chart showing the operation of an electronic control unit or receiver according to various embodiments of the present invention.

Referring now to FIG. 3, one example of the operation of the receiver is described. At step 302, information from a GPS system is received concerning the altitude of the vehicle. At step 304, the external temperature is received. At step 306, the external relative humidity is received.

At step 308, the estimated barometric pressure is determined. This can be determined using:

$$P_h = P_0 e^{-\frac{mgh}{kT}}$$

where:
$P_0$ is the barometric pressure at sea level;
m is the molecular mass of air;
g is the gravitational acceleration near Earth's surface;
h is the height above sea level (altitude) in meters;
k is the Boltzmann's constant; and
T is the temperature in Kelvins.

It will be appreciated that the molar mass of air can vary between dry air (0.0289644 kg/mol) to 100% water vapor saturated air (around 0.0180153 kg/mol), and thus the molecular mass of air will also vary respectively.

At step 310, the measured tire pressure is received from a message from the TPMS sensor. At step 312, compensation is made to the measured tire pressure using the estimated barometric pressure. Consequently, the correct compensated tire pressure is determined and this can be compared against warning criteria to see if a warning should be issued to a user. For example, the correct compensated tire pressure may be compared to a predetermined threshold and if the compensated pressure falls below the threshold, then a warning can be issued to the user at the receiver (e.g., via GUI or similar device).

Figure 4:
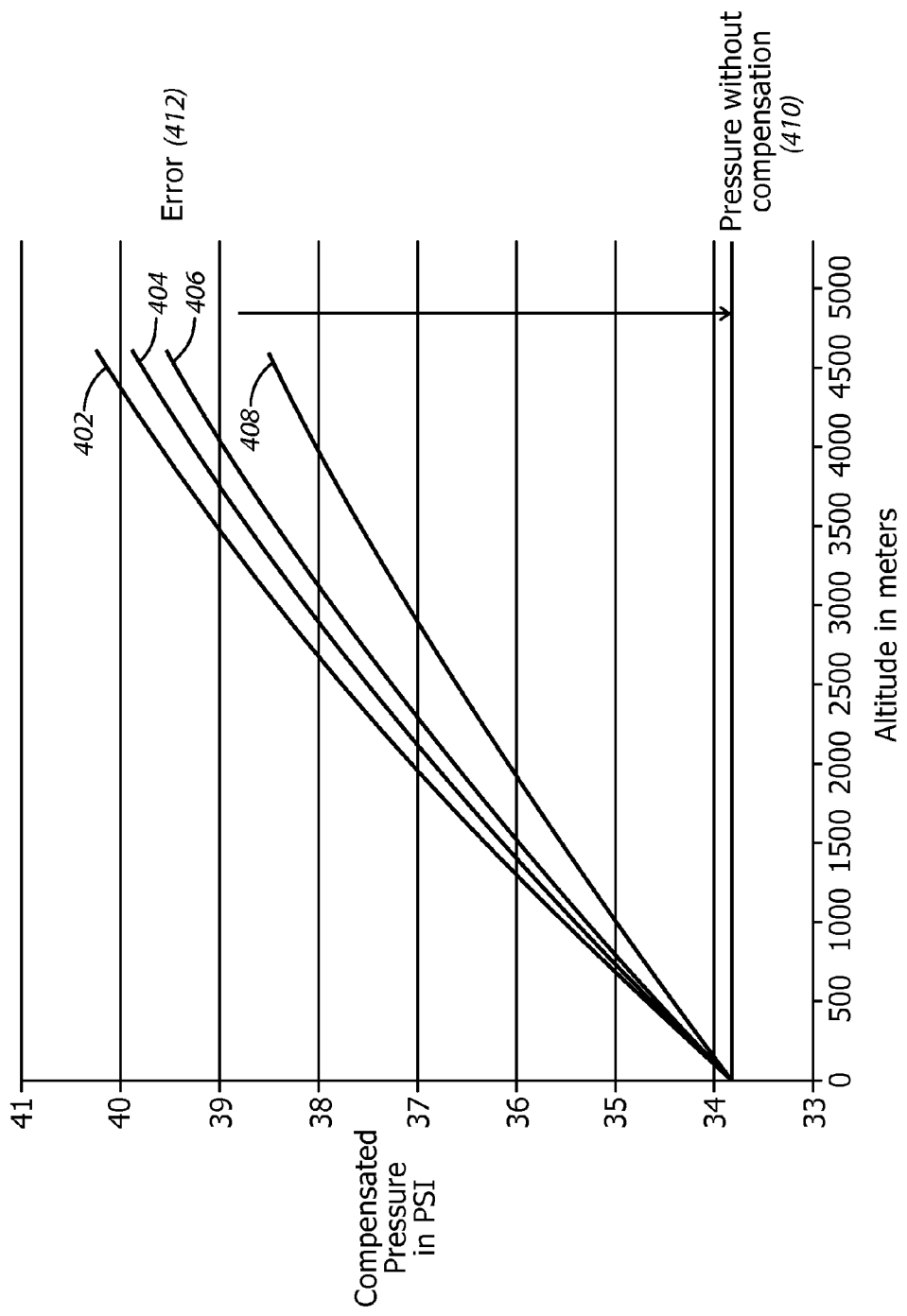
FIG. 4 comprises a graph showing advantages of the present approaches according to various embodiments of the present invention.

Referring now to FIG. 4 a graph showing various advantages of the present approaches is described. The x-axis of the graph is altitude and the y-axis represents compensated pressure. Four curves 402, 404, 406, and 408 are shown. It can be seen that the compensated pressure (obtained by the approaches described herein) changes over altitude. It also be seen that the pressure without compensation 410 does not change. Thus, various errors 412 exist without any compensation. Without the accurate compensation provided by the present approaches, inappropriate or invalid alerts may be issued to a user or no alert may issue when in fact an alert is needed.

It should be understood that any of the devices described herein (e.g., the tools, the controllers, the receivers, the transmitters, the sensors, any presentation or display devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method, the method comprising:
receiving an altitude of the vehicle from an external electronic source;
receiving an external temperature is received from a temperature sensor;
determining an external relative humidity;
based upon the altitude received from the external electronic source, the temperature, and the external relative humidity, determining an estimated barometric pressure;
receiving an air pressure of a tire;
determining an adjustment to the air pressure of the tire, the adjustment based upon the estimated barometric pressure, the adjustment applied to the air pressure of the tire to obtain a corrected tire pressure;
evaluating the corrected tire pressure to determine when an alert should be presented to a user;
when the alert is determined, presenting the alert to the user.

2. The method of claim 1 wherein the corrected tire pressure is determined according to the equation $$P_0 e^{-\frac{mgh}{kT}},$$

where $P_0$ is the barometric pressure at sea level; m is the molecular mass of air; g is the gravitational acceleration near Earth's surface, h is the altitude; k is the Boltzmann's constant; and T is the temperature.

3. The method of claim 1, wherein the air pressure of the tire is received from a message from the TPMS sensor.

4. The method of claim 1, wherein the altitude is received from a global positioning satellite (GPS) system.

5. The method of claim 1, wherein determining an external relative humidity comprises receiving the external relative humidity from a external relative humidity sensor.

6. An electronic control unit (ECU), the comprising:
an electronic interface having an input and output, the input configured to receive an altitude of the vehicle from an external electronic source and an external temperature is received from a temperature sensor;
a controller coupled to the electronic interface, the controller configured to determine an external relative humidity, the controller configured to based upon the altitude received from the external electronic source, the temperature, and the external relative humidity, determine the estimated barometric pressure, the controller configured to receive a pressure of a tire at the input of the electronic interface, the controller configured to determine an adjustment to the air pressure of the tire, the adjustment based upon the estimated barometric pressure, the adjustment being applied to the air pressure of the tire to obtain a corrected tire pressure, the controller configured to evaluate the corrected tire pressure to determine when an alert should be presented to a user and when the alter is determined, presenting the alert to the user via the output of the electronic interface.

7. The ECU of claim 6 wherein the corrected tire pressure is determined according to the equation $$P_0 e^{-\frac{mgh}{kT}},$$

where $P_0$ is the barometric pressure at sea level; m is the molecular mass of air; g is the gravitational acceleration near Earth's surface, h is the altitude; k is the Boltzmann's constant; and T is the temperature.

8. The ECU of claim 6, wherein the air pressure of the tire is received from a message from the TPMS sensor.

9. The ECU of claim 6, wherein the altitude is received from a global positioning satellite (GPS) system.

10. The ECU of claim 6, wherein the external relative humidity is determined from a measurement received from an external relative humidity sensor.

11. A computer usable non-transitory medium having a computer readable program code embodied therein, said computer readable program code adapted to be executed to implement a method of determining atmospheric pressure, the method comprising:
receiving an altitude of the vehicle from an external electronic source;
receiving an external temperature is received from a temperature sensor;
determining an external relative humidity;
based upon the altitude, the temperature, and the external relative humidity, determining the estimated barometric pressure;
receiving a pressure of a tire;
determining an adjustment to the air pressure of the tire, the adjustment based upon the estimated barometric pressure, the adjustment applied to the air pressure of the tire to obtain a corrected tire pressure;
evaluating the corrected tire pressure to determine when an alert should be presented to a user;
when the alert is determined, presenting the alert to the user.

12. The computer usable non-transitory medium of claim 11 wherein the corrected tire pressure is determined according to the equation $$P_0 e^{-\frac{mgh}{kT}},$$

where $P_0$ is the barometric pressure at sea level; m is the molecular mass of air; g is the gravitational acceleration near Earth's surface, h is the altitude; k is the Boltzmann's constant; and T is the temperature.

13. The computer usable non-transitory medium of claim 11, wherein the air pressure of the tire is received from a message from the TPMS sensor.

14. The computer usable non-transitory medium of claim 11, wherein the altitude is received from a global positioning satellite (GPS) system.

15. The computer usable non-transitory medium of claim 11, wherein determining an external relative humidity comprises receiving the external relative humidity from a external relative humidity sensor.

16. The method of claim 1 wherein the estimated barometric pressure is determined according to the equation $$P_0 e^{-\frac{mgh}{kT}},$$

where $P_0$ is the barometric pressure at sea level; m is the molecular mass of air; g is the gravitational acceleration near Earth's surface, h is the altitude; k is the Boltzmann's constant; and T is the temperature.

17. The ECU of claim 6 wherein the estimated barometric pressure is determined according to the equation $$P_0 e^{-\frac{mgh}{kT}},$$

where $P_0$ is the barometric pressure at sea level; m is the molecular mass of air; g is the gravitational acceleration near Earth's surface, h is the altitude; k is the Boltzmann's constant; and T is the temperature.

18. The computer usable non-transitory medium of claim 11 wherein the estimated barometric pressure is determined according to the equation $$P_0 e^{-\frac{mgh}{kT}},$$

where $P_0$ is the barometric pressure at sea level; m is the molecular mass of air; g is the gravitational acceleration near Earth's surface, h is the altitude; k is the Boltzmann's constant; and T is the temperature.

* * * * *